(12) United States Patent
Jansma et al.

(10) Patent No.: US 10,906,594 B2
(45) Date of Patent: Feb. 2, 2021

(54) VEHICULAR BODY STRUCTURE

(71) Applicant: Toyota Motor Engineering & Manufacturing North America, Inc., Plano, TX (US)

(72) Inventors: Matthew A. Jansma, Saline, MI (US); Christopher M. Higgins, Ann Arbor, MI (US); Herbert Meingast, Ann Arbor, MI (US); Wei Jiang, Ann Arbor, MI (US); Naoya Ashida, Miyoshi (JP); Yuki Yoshimura, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 40 days.

(21) Appl. No.: 16/426,086

(22) Filed: May 30, 2019

(65) Prior Publication Data

US 2020/0377156 A1 Dec. 3, 2020

(51) Int. Cl.
*B62D 33/02* (2006.01)
*B62D 25/20* (2006.01)
*B62D 21/09* (2006.01)

(52) U.S. Cl.
CPC ......... *B62D 25/2027* (2013.01); *B62D 21/09* (2013.01); *B62D 33/02* (2013.01); *B60Y 2200/141* (2013.01)

(58) Field of Classification Search
CPC .......... B62D 25/2027; B62D 25/2054; B62D 33/02; B62D 21/09; B60Y 2200/141
USPC .......................................................... 296/183.1
See application file for complete search history.

(56) References Cited

U.S. PATENT DOCUMENTS

| | | | |
|---|---|---|---|
| 4,241,146 A * | 12/1980 | Sivachenko | B21B 1/095 428/124 |
| 4,976,490 A * | 12/1990 | Gentle | B29C 70/023 296/183.1 |
| 6,347,454 B1 * | 2/2002 | Jurica | B62D 25/2054 29/417 |
| 7,575,264 B1 | 8/2009 | Solomon | |
| 7,731,271 B2 | 6/2010 | Shelbo et al. | |
| 9,592,853 B2 | 3/2017 | Aitharaju et al. | |
| 9,650,003 B2 | 5/2017 | Owens et al. | |
| 2005/0242620 A1 * | 11/2005 | McNulty | B62D 33/02 296/183.1 |
| 2006/0087152 A1 * | 4/2006 | Kuriakose | B62D 25/2054 296/184.1 |
| 2007/0046056 A1 * | 3/2007 | Delaney | B62D 33/02 296/37.6 |
| 2007/0216197 A1 * | 9/2007 | Wuerfel, III | B62D 25/2054 296/184.1 |

(Continued)

*Primary Examiner* — Gregory A Blankenship
(74) *Attorney, Agent, or Firm* — Christopher G. Darrow; Darrow Mustafa PC

(57) ABSTRACT

A vehicular body structure includes a polymeric deck panel. The deck panel includes adjacent ridges and valleys with legs shared therebetween, crossbeam footprints crosswise to the adjacent ridges and valleys, and ribs extending along the adjacent ridges and valleys between the crossbeam footprints and ending short thereof. The ribs project normally to the deck panel past the ridges, and have elongate cross-sectional shapes, with cross-sectional thicknesses substantially the same as or greater than the cross-sectional thicknesses of the adjacent ridges and valleys.

20 Claims, 4 Drawing Sheets

(56) References Cited

U.S. PATENT DOCUMENTS

2008/0277969 A1* 11/2008 Sato .................. B62D 25/2054
296/193.08
2011/0031778 A1* 2/2011 Edwards .................. B60R 9/00
296/183.1
2013/0313860 A1* 11/2013 Yamaji .................. B62D 25/20
296/193.07
2016/0368540 A1* 12/2016 Terada .................... B29C 43/14

* cited by examiner

VEHICULAR BODY STRUCTURE

TECHNICAL FIELD

The embodiments disclosed herein relate to the bodies of vehicles and, more particularly, to structures for the bodies of vehicles with beds.

BACKGROUND

The bodies of vehicles and, more particularly, the structures for the bodies of vehicles with beds, have long been a focus of automotive design. Some of these structures involve bodies that, in association with the beds, include polymeric body elements or other alternatives to traditional metallic body elements.

SUMMARY

Disclosed herein are embodiments of a structure for the body of a vehicle with a bed. In one aspect, a vehicular body structure includes a polymeric deck panel. The deck panel includes adjacent ridges and valleys with legs shared therebetween, crossbeam footprints crosswise to the adjacent ridges and valleys, and ribs extending along the adjacent ridges and valleys between the crossbeam footprints and ending short thereof. The ribs project normally to the deck panel past the ridges, and have elongate cross-sectional shapes, with cross-sectional thicknesses substantially the same as or greater than the cross-sectional thicknesses of the adjacent ridges and valleys.

In another aspect, a vehicular body structure includes a polymeric deck panel. The deck panel includes adjacent ridges and valleys with legs shared therebetween, crossbeam footprints crosswise to the adjacent ridges and valleys, and ribs extending along the adjacent ridges and valleys between the crossbeam footprints and ending short thereof. The ribs project normally to the deck panel past the ridges to continuously deepen the valleys as continuous extensions of the legs.

In yet another aspect, a vehicle includes metallic hat-shaped crossbeams, and a unitarily-formed polymeric bed box resting atop the crossbeams, with the crossbeams secured thereto. Each crossbeam includes a base, upturned sides extending from the base, and outturned rests respectively extending from the sides, with the bed box resting atop the crossbeams on the rests. The bed box includes a deck panel, side panels and a bulkhead panel. The deck panel includes adjacent ridges and valleys with legs shared therebetween crosswise to the crossbeams, with the ridges engaged with the rests, and ribs extending along the adjacent ridges and valleys between the crossbeams and ending short thereof. The adjacent ridges and valleys have hollowed trapezoidal cross-sectional shapes, with the ridges having angular transitions into the legs shared with adjacent valleys. The ribs project from the transitions normally to the deck panel past the ridges to continuously deepen the valleys as angular but continuous extensions of the legs, and have rectangular cross-sectional shapes, with cross-sectional thicknesses substantially the same as or greater than the cross-sectional thicknesses of the adjacent ridges and valleys.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a structure for realizing the benefits of a vehicle with a bed whose body includes associated polymeric body elements, including as part of a unitarily-formed polymeric bed box. Among other things, the vehicle enjoys improved mass compared to otherwise similar vehicles with traditional metallic body elements. Moreover, the polymeric body elements offer vehicle manufacturers opportunities for improved manufacturability, improved cost and the like.

In order to strengthen the bed against cargo loading, a deck panel thereof includes ribbed sections implemented across a corrugated section, where the deck panel includes both adjacent ridges and valleys, and ribs extending along the adjacent ridges and valleys. Specifically, the ribs extend between crossbeams secured to the deck panel, but end short of the crossbeams, leaving the crossbeams free to engage with the ridges. Accordingly, although the deck panel is locally rigidified against cargo loading in the ribbed sections, remaining, non-ribbed sections along the crossbeams leave the deck panel globally flexible against relatively more dynamic and multidirectional chassis loading. Although these and other teachings find application in the vehicle disclosed herein, it will be understood that this disclosure is applicable in principle to otherwise similar vehicles with any combination of polymeric body elements, other non-metallic and metallic alternatives to traditional metallic body elements, and traditional metallic body elements.

Figure 1A:
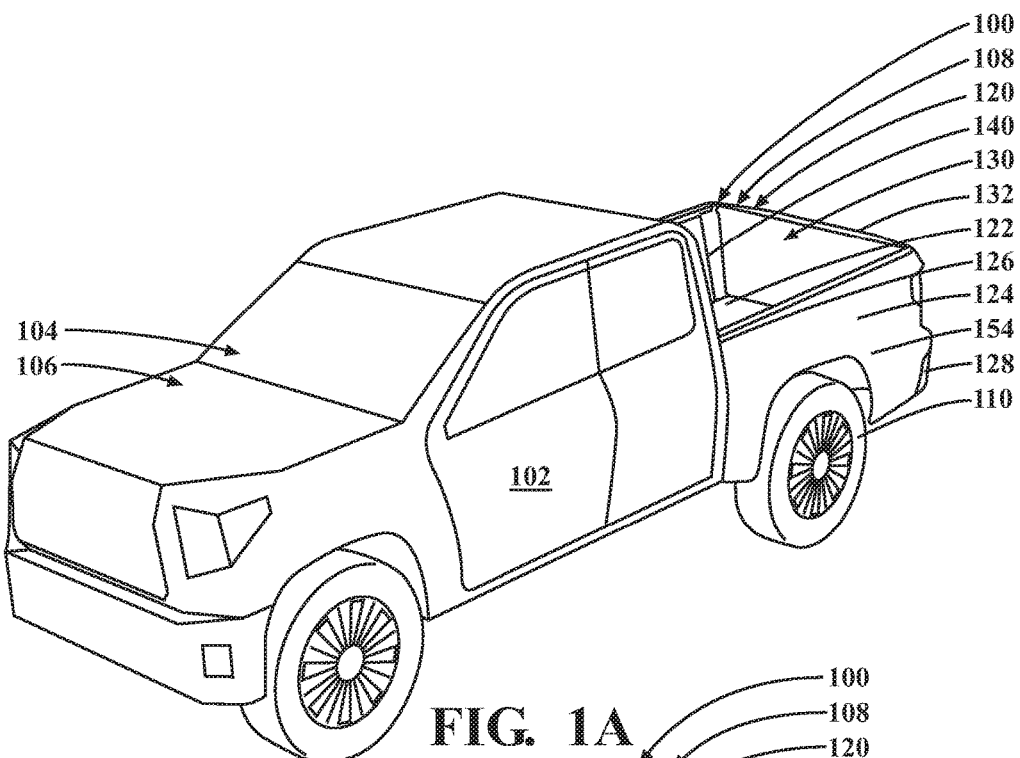
FIG. 1A is a perspective view of a vehicle with a bed whose body includes a polymeric bed box.
Figure 1B:
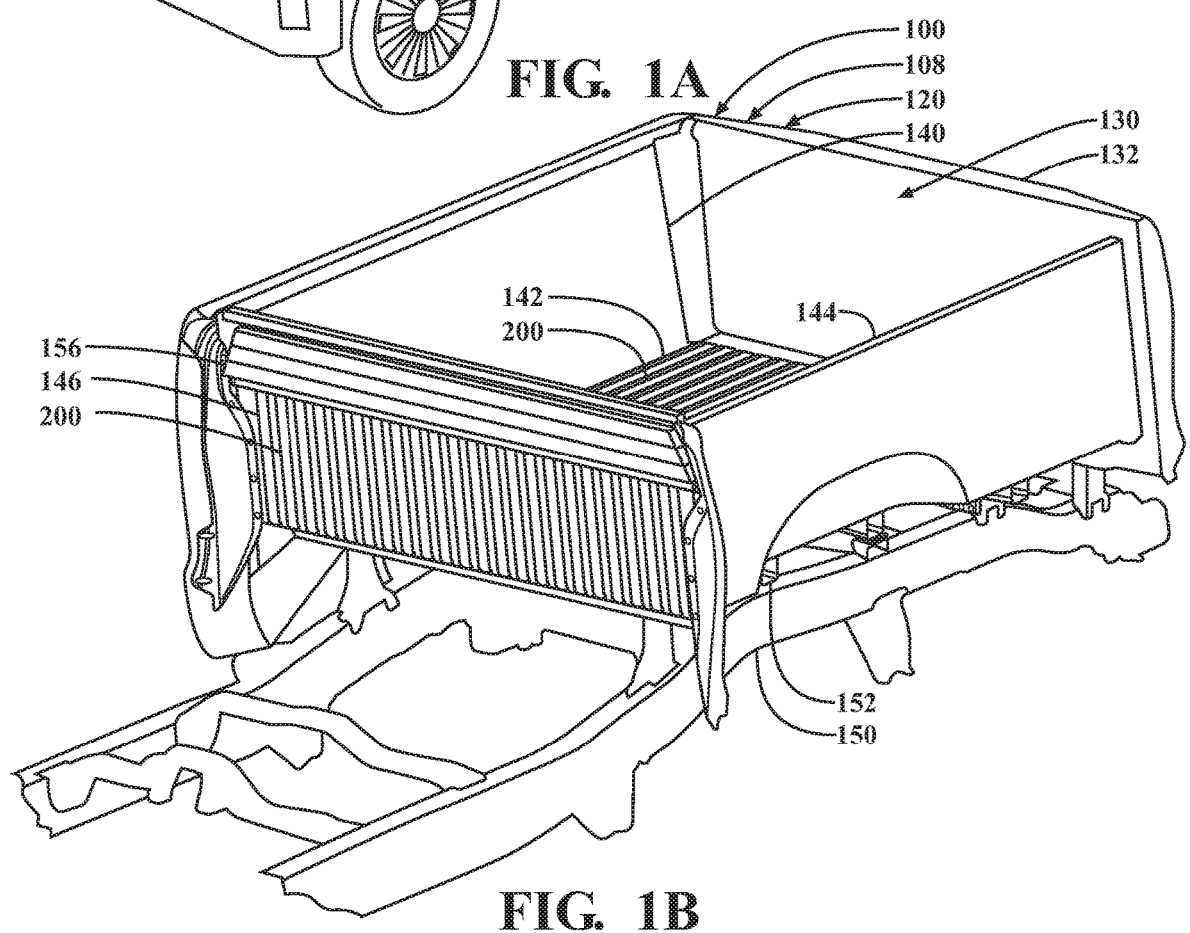
FIG. 1B is a perspective view of the body with a rear quarter panel removed for better viewing, showing frame rails, crossbeams resting atop the frame rails, a deck panel of the bed box resting atop the crossbeams, and a reinforcement backed against a bulkhead panel of the bed box.

A representative passenger vehicle 100 is shown in FIGS. 1A and 1B. In this description, uses of "front," "forward" and the like, and uses of "rear," "rearward" and the like, refer to the longitudinal directions of the vehicle 100. "Front," "forward" and the like refer to the front (fore) of the vehicle 100, while "rear," "rearward" and the like refer to the back (aft) of the vehicle 100. Uses of "side," "sideways," "transverse" and the like refer to the lateral directions of the vehicle 100, with "driver's side" and the like referring to the left side of the vehicle 100, and "passenger side" and the like referring to the right side of the vehicle 100.

As shown, the vehicle 100 is a pickup truck. The vehicle 100 includes an exterior 102 and a number of interior compartments. The compartments include a passenger compartment 104, an engine compartment 106 and, in the illustrated pickup truck configuration of the vehicle 100, an open-topped bed 108 for carrying cargo. Among other things, the vehicle 100 may include seats, a dash assembly, an instrument panel, controls and the like housed in the passenger compartment 104. Additionally, the vehicle 100 may include an engine, a motor, a transmission and the like, as well as other powertrain components, such as wheels 110, housed in the engine compartment 106 and elsewhere in the vehicle 100. The wheels 110 support the remainder of the vehicle 100 on the ground. One, some or all of the wheels 110 are powered by the remainder of the powertrain components to drive the vehicle 100 along the ground.

The vehicle 100 includes a body 120 that forms the exterior 102 and defines or otherwise encloses the bed 108 and other compartments. In relation to the bed 108, the body 120 includes a deck 122, two sides 124, a bulkhead 126 and a rear end 128. Additionally, in relation to the passenger compartment 104 and the engine compartment 106, the vehicle 100 may include a floor forward of the deck 122, a partition forward of the bulkhead 126, a front end, a roof, a hood and the like. At the rear end 128, the body 120 defines a tailgate opening 130. Similarly to other openings that open between the compartments and the exterior 102, the tailgate opening 130 opens between the bed 108 and the exterior 102. Relatedly, as part of the rear end 128, the body 120 includes a tailgate 132 corresponding to the tailgate opening 130. Similarly to other closure panels that correspond to other openings, the tailgate 132 is pivotally connected to the remainder of the body 120 for movement, relative to the tailgate opening 130, between a closed position over the tailgate opening 130, and an open position away from the tailgate opening 130.

The body 120 is constructed from any combination of rigidly interconnected frame members, panels and other body elements, as well as any combination of overlying paneling, trim, upholstery and other body coverings. In relation to the bed 108, the body 120 includes an open-topped bed box 140. Also referable to as an "inner," the bed box 140 is different from bed liners insofar as that while bed liners are essentially body coverings, the bed box 140 is a body element, and includes body sub-elements, indispensable to the construction of the body 120 itself. The bed box 140 includes a deck panel 142, two side panels 144 and a bulkhead panel 146. As part of the deck 122, the body 120 includes the deck panel 142 as an overlying body element, as well as two frame rails 150 and a number of crossbeams 152 as underlying body elements. Moreover, as part of the sides 124, the body 120 includes the side panels 144 as inner body elements, as well as two rear quarter panels 154 (one shown, with the other being a mirror image) as outer body elements. Moreover, as part of the bulkhead 126, the body 120 includes the bulkhead panel 146 as an inner body element, as well as an elongate reinforcement 156 as an outer body element. At the rear end 128, the body 120 defines the tailgate opening 130 in the space between side panels 144.

The deck 122 is horizontal, and extends longitudinally between the bulkhead 126 and the rear end 128, and laterally between the sides 124. At the deck 122, as part of the body 120, the frame rails 150, the crossbeams 152 and the deck panel 142 are secured to one another. Relatedly, the bed box 140 is secured at the deck panel 142 to the frame rails 150 via the crossbeams 152. As part of the deck 122, the frame rails 150, the crossbeams 152 and the deck panel 142 are horizontal, and vertically spaced apart from one another, with the crossbeams 152 overlying and resting atop the frame rails 150, and the deck panel 142, as well as the bed box 140 to which the deck panel 142 belongs, overlying and resting atop the crossbeams 152. The frame rails 150 are laterally spaced apart from one another, and extend longitudinally along the sides 124, from forward of the bulkhead 126, between the bulkhead 126 and the rear end 128. The crossbeams 152 are longitudinally spaced apart from one another between the bulkhead 126 and the rear end 128, and extend laterally between the frame rails 150 along the sides 124. The deck panel 142 extends longitudinally from the bulkhead 126, and laterally between the frame rails 150 along the sides 124.

The bulkhead 126 is upright, and extends vertically from the deck 122, and laterally between the sides 124. At the bulkhead 126, as part of the body 120, the bulkhead panel 146 and the reinforcement 156 are secured to one another. As part of the bulkhead 126, the bulkhead panel 146 and the reinforcement 156 are upright, and longitudinally spaced apart from one another, with the reinforcement 156 forward of and backed against the bulkhead panel 146. The bulkhead panel 146 extends vertically from the deck 122, and laterally between the frame rails 150 along the sides 124. The reinforcement 156 extends vertically from above the deck 122, and laterally between the frame rails 150 along the sides 124.

In relation to the bed box 140, the deck panel 142, as part of the bed box 140, extends longitudinally from the bulkhead panel 146, and laterally between the side panels 144. Moreover, the frame rails 150 extend longitudinally across the deck panel 142 alongside the lateral peripheries thereof. Moreover, the crossbeams 152 extend laterally across the deck panel 142 between the lateral peripheries thereof to end flush with the side panels 144. Relatedly, as part of the deck panel 142, the bed box 140 includes frame rail footprints and crossbeam footprints therefor respectively corresponding to the locations where the frame rails 150 and the crossbeams 152 extend or, in a preassembled state, will extend across the deck panel 142. As part of an integral unit with the bed box 140, the crossbeams 152 are directly secured thereto, including to the deck panel 142. Moreover, with the crossbeams 152 secured to the deck panel 142, the crossbeams 152 are secured to the frame rails 150.

The bulkhead panel 146, as part of the bed box 140, extends vertically from the deck panel 142, and laterally between the side panels 144. Moreover, the reinforcement 156 extends vertically from above the deck panel 142 across approximately the uppermost ⅓ of the bulkhead panel 146, laterally across the bulkhead panel 146 between the lateral peripheries thereof, and laterally past the bulkhead panel 146 to end laterally outside the junctions between the bulkhead panel 146 and the side panels 144. As part of an integral unit with the bed box 140, the reinforcement 156 is directly secured thereto, including to the bulkhead panel 146.

The bed box 140 has a molded or otherwise unitarily-formed construction. Moreover, the bed box 140 is made from one or more high-strength, durable and corrosion-resistant polymeric materials. For instance, the bed box 140 may be made from one or more fiber-reinforced thermosetting resins suitable for compression molding, such as sheet molding compound, including sheet molding compound featuring polyester and any combination of glass fibers (i.e., fiberglass), carbon fibers and the like. The body elements besides the bed box 140 may have molded constructions, and may be made from one or more polymeric materials suitable for molding, such as thermosetting resins, including fiber-reinforced thermosetting resins. Additionally, or alternatively, the body elements besides the bed box 140 may have any combination of fabricated, bent, stamped, extruded, casted and like constructions, and may be made from one or more metallic materials. For instance, the frame rails 150, the crossbeams 152 and the rear quarter panels 154 may be made from one or more metals, such as steel or aluminum. For instance, the reinforcement 156 has an extruded construction, and may be made from one or more metals suitable for extrusion, such as aluminum.

The body 120 imparts structure to the vehicle 100, including when the vehicle 100 experiences cargo loading or, in other words, locally normal loading on the vehicle 100 by cargo in the bed 108. The body 120, including the deck 122, the sides 124 and the bulkhead 126, plays a principal role in maintaining the bed 108 against cargo loading on behalf of the vehicle 100. Relatedly, each body element included as part of the deck 122, the sides 124 and the bulkhead 126 may play a role in strengthening the bed 108 against cargo loading.

Although the bed box 140 includes various surface geometries for increased rigidity, from the perspective of the body 120, the deck panel 142 and the bulkhead panel 146 alone, by design, have insufficient strengths against cargo loading. Rather than increasing the cross-sectional thicknesses of the deck panel 142 and the bulkhead panel 146 or otherwise introducing mass-related compromises for increased strength against cargo loading, the body 120 includes the crossbeams 152 and the reinforcement 156 for structural reinforcement. When the vehicle 100 experiences cargo loading at the deck 122, the crossbeams 152 structurally reinforce the body 120 against the deck panel 142 flexing toward the ground. Similarly, when the vehicle 100 experiences cargo loading at the bulkhead 126, the reinforcement 156 structurally reinforces the body 120 against the bulkhead panel 146 flexing toward the passenger compartment 104.

Figure 2A:
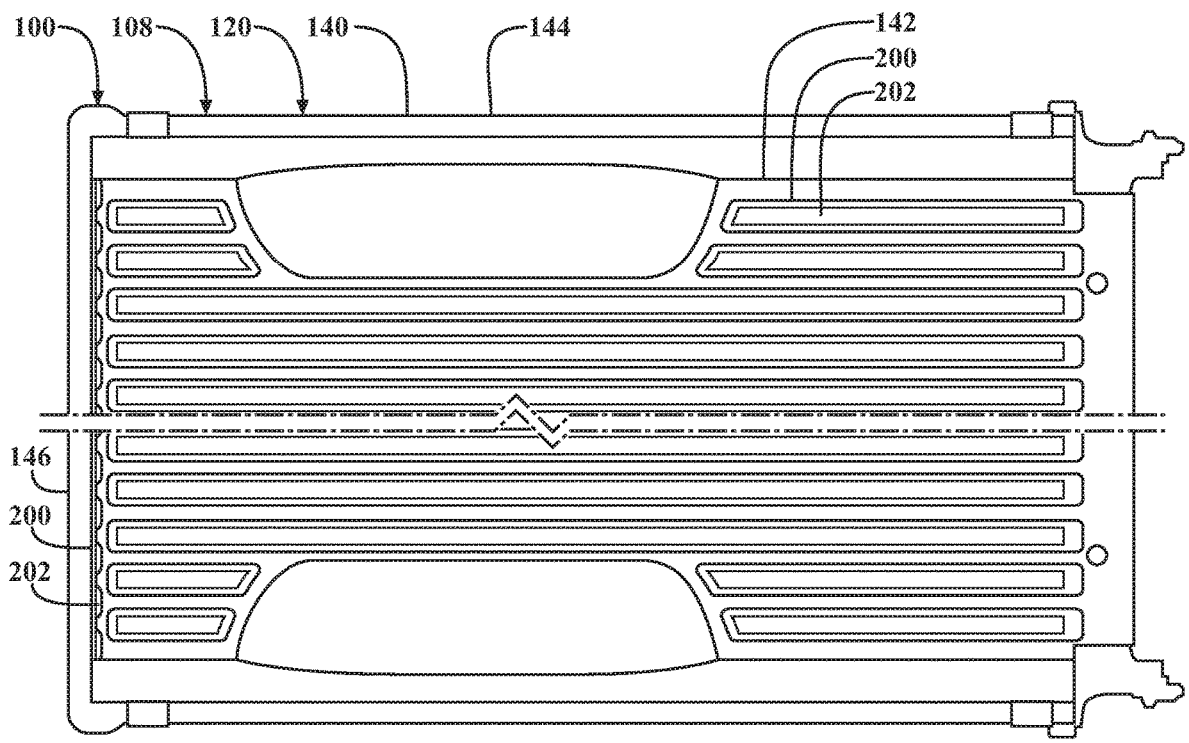
FIGS. 2A and 2B are top and bottom views, respectively, of a unit including the bed box, and the crossbeams and the reinforcement secured thereto, showing a corrugated section across the deck panel, and a corrugated section across the bulkhead panel.
Figure 2B:
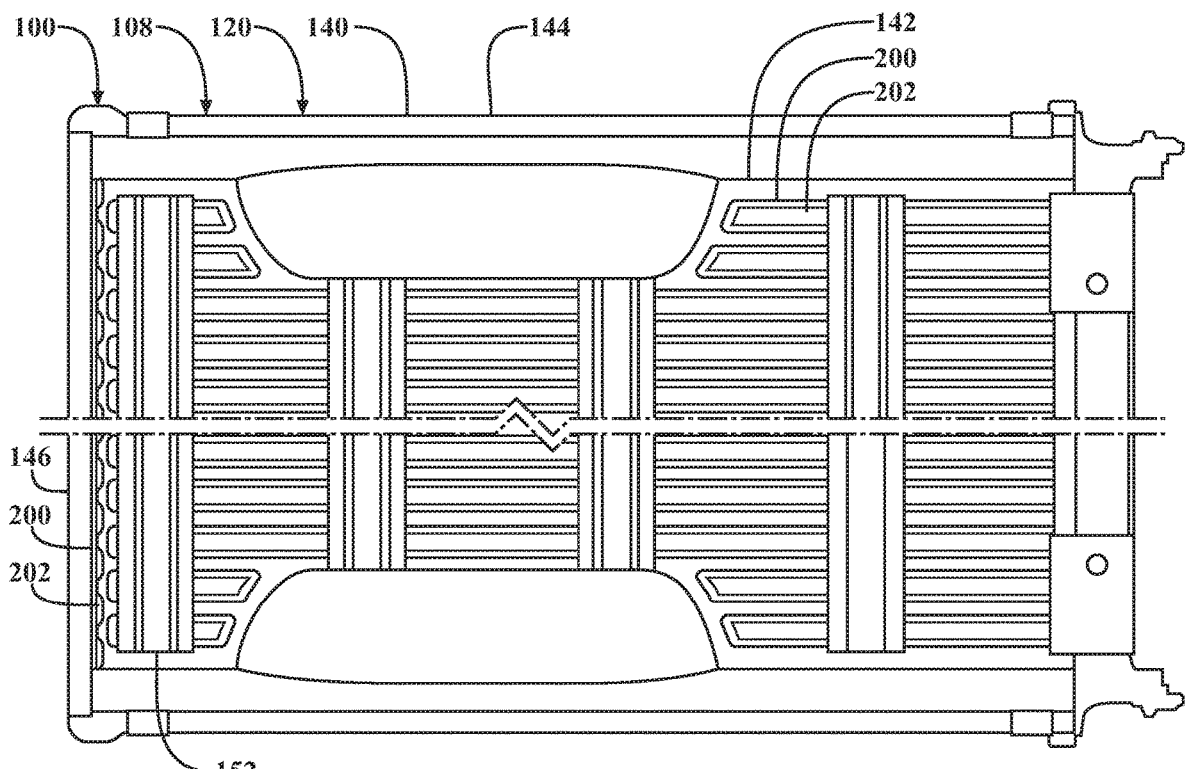

From its inner location enclosing the bed 108, the bed box 140 directly assumes cargo loading. As noted above, in order to strengthen the bed 108 against cargo loading, the bed box 140 includes various surface geometries for increased rigidity. For instance, as shown with additional reference to FIGS. 2A and 2B, the bed box 140 includes one or more corrugated sections 200. Moreover, as shown with additional reference to FIGS. 3A, 3B, 3C and 3D, the bed box 140 includes one or more ribbed sections 300, including ribbed sections 300 implemented across the corrugated sections 200. In the corrugated sections 200 and the ribbed sections 300, the bed box 140 is rigidified or, in other words, has increased rigidity compared to otherwise similar bed boxes with non-corrugated sections and non-ribbed sections, as the case may be.

In each corrugated section 200, the bed box 140 is corrugated or, in other words, repeatedly doubled over itself. The bed box 140 thereby includes a series of unitarily-formed corrugations 202 or, in other words, adjacent ridges and valleys. One, some or all of the corrugations 202 may have hollowed trapezoidal cross-sectional shapes. For instance, as shown, each corrugation 202 has a hollowed trapezoidal cross-sectional shape. With the corrugations 202 having hollowed trapezoidal cross-sectional shapes, the corrugations 202 generally simulate a trapezoidal wave, and the bed box 140 includes adjacent flat-topped ridges and flat-bottomed valleys. Relatedly, the bed box 140 includes flattened legs 302 shared between the adjacent ridges and valleys and, as part of the adjacent ridges and valleys, angular transitions 304 into the legs 302. In each ribbed section 300, the bed box 140 is ribbed. The bed box 140 thereby includes a series of unitarily-formed ribs 306. One, some or all of the ribs 306 may have squared cross-sectional shapes. For instance, as shown, each rib 306 has a squared cross-sectional shape. With the ribs 306 having squared cross-sectional shapes, the bed box 140 includes flat-sided and flat-ended ribs 306.

The bed box 140 includes a corrugated section 200 across the deck panel 142. In the corrugated section 200, the deck panel 142 is corrugated to include corrugations 202 that, with the deck panel 142 being horizontal, are adjacent underside ridges/topside valleys and topside ridges/underside valleys. In other words, the corrugations 202 are adjacent underside ridges and underside valleys that correspond to adjacent topside valleys and topside ridges. As shown, the deck panel 142 is laterally corrugated, with the corrugations 202 extending longitudinally crosswise to the crossbeams 152. Moreover, the corrugated section 200 is implemented across substantially all of the deck panel 142. Relatedly, with the deck panel 142 resting atop the crossbeams 152, the crossbeams 152 engage with the underside ridges, leaving spaces between the crossbeams 152 and the adjacent underside valleys. Specifically, as shown for a representative crossbeam 152, each crossbeam 152 is channel-like, and has a hat-shaped cross-sectional shape. Relatedly, each crossbeam 152 includes a base 320, two upturned sides 322 extending from the base 320, and two outturned rests 324 for the deck panel 142 respectively extending from the sides 322. Each crossbeam 152 and the deck panel 142 are mutually configured for resting engagement in which, with the deck panel 142 resting atop the crossbeam 152, the deck panel 142 and the crossbeam 152 are engaged with one another. As shown, with the corrugations 202 being crosswise to the crossbeams 152, the deck panel 142 rests atop the crossbeams 152 on the rests 324, with the corrugations 202 and the rests 324 engaged with one another. Specifically, with the corrugations 202 being adjacent underside ridges and underside valleys, the underside ridges and the rests 324 engage with one another, leaving spaces between the rests 324 and the adjacent underside valleys.

Similarly, the bed box 140 includes a corrugated section 200 across the bulkhead panel 146. In the corrugated section 200, the bulkhead panel 146 is corrugated to include corrugations 202 that, with the bulkhead panel 146 being upright, are adjacent outside ridges/inside valleys and inside ridges/outside valleys. In other words, the corrugations 202 are adjacent outside ridges and outside valleys that correspond to adjacent inside valleys and inside ridges. As shown, the bulkhead panel 146 is laterally corrugated, with the corrugations 202 extending vertically crosswise to the reinforcement 156. Moreover, the corrugated section 200 is implemented across substantially all of the bulkhead panel 146. Relatedly, with the reinforcement 156 backed against the bulkhead panel 146, the reinforcement 156 engages with the outside ridges, leaving spaces between the reinforcement 156 and the adjacent outside valleys.

As shown with particular reference to FIGS. 3A, 3B, 3C and 3D, the bed box 140 includes a number of ribbed sections 300 across the deck panel 142. Specifically, in relation to strengthening the bed 108 against cargo loading, the ribbed sections 300 are implemented across the corrugated section 200 to further rigidify the deck panel 142. In each ribbed section 300, the deck panel 142 is ribbed to include ribs 306 that, with the deck panel 142 being horizontal, are upright. Moreover, the ribs 306 are underside ribs 306. As shown, the deck panel 142 is laterally ribbed, with the underside ribs 306 extending longitudinally crosswise to the crossbeams 152. In relation to the corrugated section 200, the underside ribs 306 extend longitudinally along the adjacent underside ridges and underside valleys, and project past the underside ridges. Relatedly, with the deck panel 142 having spans 308 between the crossbeams 152, the ribbed sections 300 are exclusively implemented across one, some or all of the spans 308. Accordingly, the underside ribs 306 extend longitudinally between the crossbeams 152, and longitudinally end short of the crossbeams 152, leaving the crossbeams 152 free to engage with the underside ridges.

The ribbed sections 300 may be implemented across all of the spans 308. Alternatively, the ribbed sections 300 may be implemented across some of the spans 308. For instance, the ribbed sections 300 may be selectively implemented across only the spans 308 where increased strength against cargo loading is called for. Relatedly, the underside ribs 306 may be shaped, sized and otherwise configured for increased rigidity on any combination of an individual basis, a group basis, including a ribbed section 300 basis, and the like. For instance, one, some or all of the underside ribs 306 may be individually configured for increased rigidity based on location. Additionally, or alternatively, one, some or all of the underside ribs 306 may have standardized configurations for increased rigidity.

Notably, although rigidified in relation to strengthening the bed 108 against cargo loading, the deck panel 142, in acquiescence to the relative movement of the frame rails 150, is meant to bend, twist and otherwise flex against relatively more dynamic and multidirectional chassis loading. However, beyond leaving the crossbeams 152 free to engage with the underside ridges, implementing the ribbed sections 300 across the spans 308 opens opportunities to configure the underside ribs 306 for relatively more increased rigidity.

Specifically, as implemented across the spans 308, the ribbed sections 300 are discontinuous across the deck panel 142. Accordingly, although the deck panel 142 is locally rigidified against cargo loading across the spans 308, remaining, non-ribbed sections along the crossbeams 152 leave the deck panel 142 globally flexible against chassis loading. Moreover, in extending longitudinally between the crossbeams 152, the underside ribs 306 have lengths limited to as long as, or otherwise no longer than, the longitudinal distance between successive crossbeams 152. Accordingly, although the deck panel 142 is meant to flex against chassis loading, the underside ribs 306 are left free from pronounced flexing against chassis loading compared to not only the deck panel 142, but also otherwise similar underside ribs 306 not ending short of the crossbeams 152.

Figure 3A:
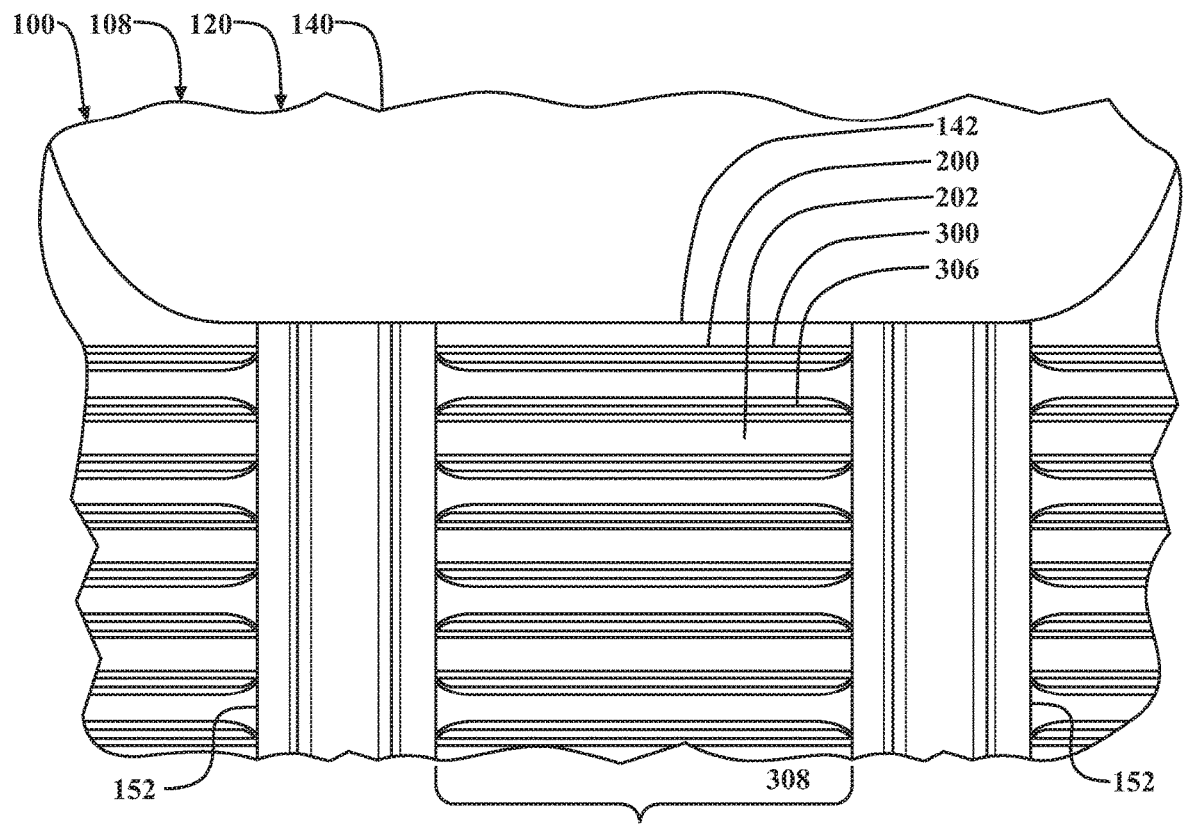
FIGS. 3A and 3B are bottom and cross-sectional views, respectively, of a unit including the bed box and the crossbeams secured thereto, showing ribbed sections across the deck panel that are, moreover, implemented across the corrugated section.
Figure 3B:
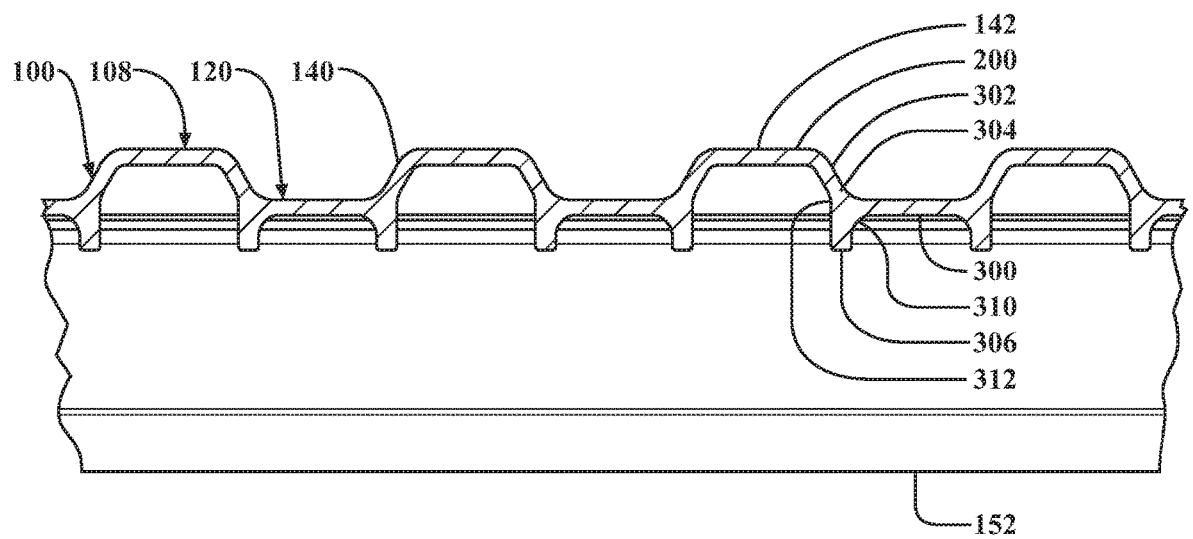
Figure 3C:
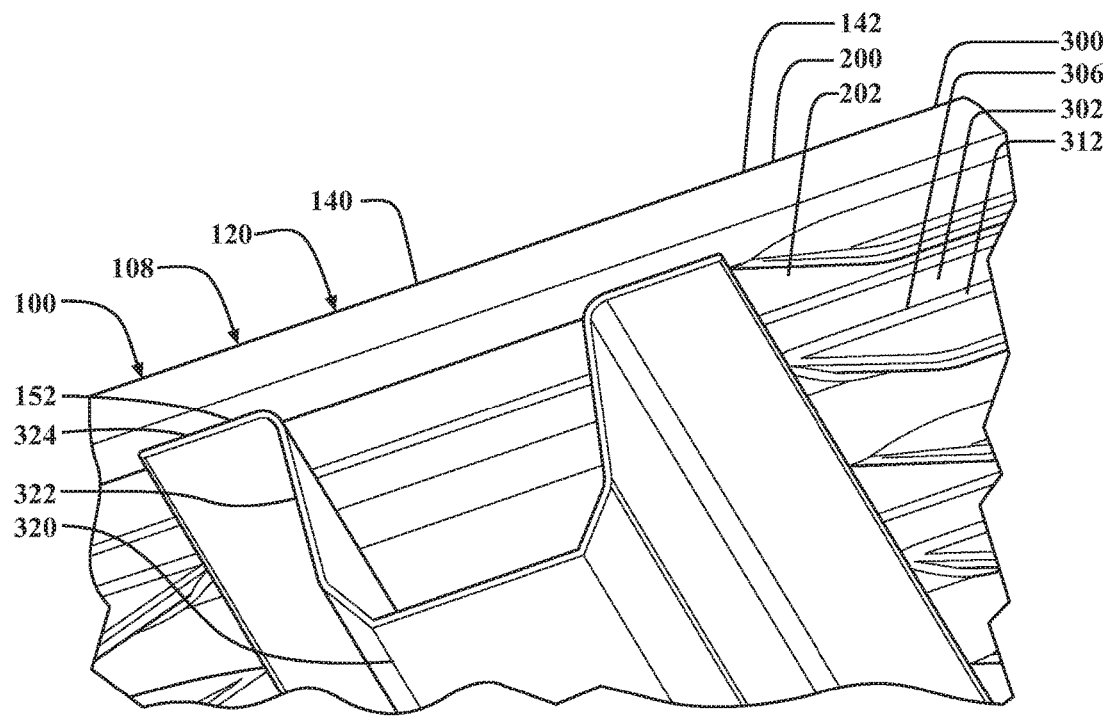
FIGS. 3C and 3D are bottom and cross-sectional views, respectively, of the unit including the bed box and the crossbeams secured thereto, further showing the ribbed sections implemented across the corrugated section.
Figure 3D:
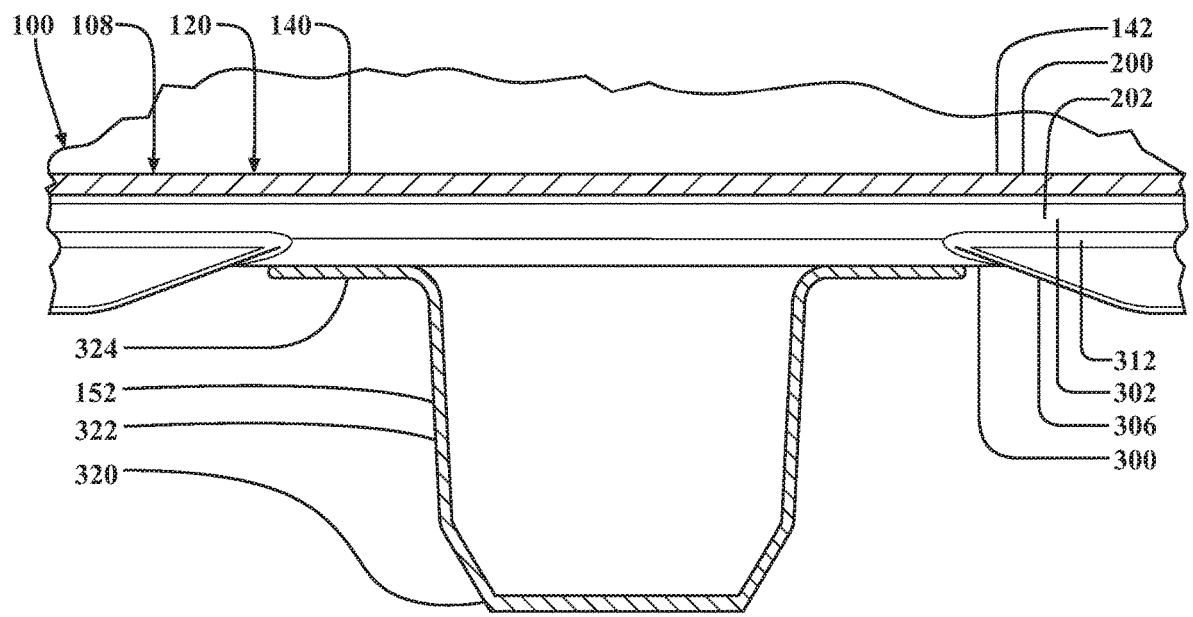

As shown with particular reference to FIG. 3B, with the implementation of the ribbed sections 300 across the spans 308 leaving the deck panel 142 globally flexible against chassis loading, and leaving the underside ribs 306 free from pronounced flexing against chassis loading, the deck panel 142 includes underside ribs 306 configured for relatively more increased rigidity.

Among other things, in relation to the implementation of the ribbed sections 300 across the corrugated section 200 to further rigidify the deck panel 142, the underside ribs 306 continuously deepen the underside valleys. Specifically, from the transitions 304 of the underside ridges into the legs 302 shared with the adjacent underside valleys, the underside ribs 306 project normally to the deck panel 142 as angular but continuous extensions of the legs 302. Relatedly, the underside ribs 306 are sizable. For instance, the underside ribs 306 have cross-sectional thicknesses substantially the same as or greater than the cross-sectional thicknesses of the adjacent underside ridges and underside valleys, including the cross-sectional thicknesses of the legs 302. At the same time, the underside ribs 306 have elongate cross-sectional shapes, with their cross-sectional heights being greater than their cross-sectional thicknesses. For instance, as shown, each underside rib 306 has a rectangular cross-sectional shape. Moreover, from their locations projecting from the transitions 304 of the underside ridges into the legs 302, the underside ribs 306 include fillets 310 into the underside ridges, and fillets 312 into the legs 302.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicular body structure, comprising:
   a polymeric deck panel, the deck panel including adjacent ridges and valleys with legs shared therebetween, crossbeam footprints crosswise to the adjacent ridges and valleys, and ribs extending along the adjacent ridges and valleys between the crossbeam footprints and ending short thereof, the ribs projecting normally to the deck panel past the ridges, and having elongate cross-sectional shapes, with cross-sectional thicknesses substantially the same as or greater than the cross-sectional thicknesses of the adjacent ridges and valleys.

2. The vehicular body structure of claim 1, wherein the ribs have rectangular cross-sectional shapes.

3. The vehicular body structure of claim 1, wherein the ribs project normally to the deck panel past the ridges to continuously deepen the valleys as continuous extensions of the legs.

4. The vehicular body structure of claim 1, wherein the ribs include at least one of fillets into the ridges and fillets into the legs.

5. The vehicular body structure of claim 1, wherein the ribs include fillets into the ridges and fillets into the legs.

6. The vehicular body structure of claim 1, wherein the adjacent ridges and valleys correspond to adjacent valleys and ridges.

7. The vehicular body structure of claim 1, further comprising:
   hat-shaped crossbeams secured to the deck panel respectively along the crossbeam footprints, each crossbeam including a base, upturned sides extending from the base, and outturned rests respectively extending from the sides, the rests engaged with the ridges.

8. A vehicular body structure, comprising:
   a polymeric deck panel, the deck panel including adjacent ridges and valleys with legs shared therebetween, crossbeam footprints crosswise to the adjacent ridges and valleys, and ribs extending along the adjacent ridges and valleys between the crossbeam footprints and ending short thereof, the ribs projecting normally to the deck panel past the ridges to continuously deepen the valleys as continuous extensions of the legs.

9. The vehicular body structure of claim 8, wherein the ridges have angular transitions into the legs shared with adjacent valleys, and the ribs continuously deepen the valleys as angular but continuous extensions of the legs.

10. The vehicular body structure of claim 8, wherein the ribs have squared cross-sectional shapes.

11. The vehicular body structure of claim 8, wherein the ribs have rectangular cross-sectional shapes.

12. The vehicular body structure of claim 8, wherein the ribs have cross-sectional thicknesses substantially the same as or greater than the cross-sectional thicknesses of the adjacent ridges and valleys.

13. The vehicular body structure of claim 8, wherein the ribs include at least one of fillets into the ridges and fillets into the legs.

14. The vehicular body structure of claim 8, wherein the ribs include fillets into the ridges and fillets into the legs.

15. The vehicular body structure of claim 8, wherein the adjacent ridges and valleys correspond to adjacent valleys and ridges.

16. The vehicular body structure of claim 8, further comprising:
hat-shaped crossbeams secured to the deck panel respectively along the crossbeam footprints, each crossbeam including a base, upturned sides extending from the base, and outturned rests respectively extending from the sides, the rests engaged with the ridges.

17. A vehicle, comprising:
metallic hat-shaped crossbeams, each crossbeam including a base, upturned sides extending from the base, and outturned rests respectively extending from the sides; and
a unitarily-formed polymeric bed box resting atop the crossbeams on the rests, with the crossbeams secured thereto, the bed box including a deck panel, side panels and a bulkhead panel, the deck panel including adjacent ridges and valleys with legs shared therebetween crosswise to the crossbeams, with the ridges engaged with the rests, and ribs extending along the adjacent ridges and valleys between the crossbeams and ending short thereof, the adjacent ridges and valleys having hollowed trapezoidal cross-sectional shapes, with the ridges having angular transitions into the legs shared with adjacent valleys, and the ribs projecting from the transitions normally to the deck panel past the ridges to continuously deepen the valleys as angular but continuous extensions of the legs, and having rectangular cross-sectional shapes, with cross-sectional thicknesses substantially the same as or greater than the cross-sectional thicknesses of the adjacent ridges and valleys.

18. The vehicle of claim 17, wherein the ribs include at least one of fillets into the ridges and fillets into the legs.

19. The vehicle of claim 17, wherein the ribs include fillets into the ridges and fillets into the legs.

20. The vehicle of claim 17, wherein the adjacent ridges and valleys correspond to adjacent valleys and ridges.

* * * * *